(12) United States Patent
Zhang et al.

(10) Patent No.: US 12,369,724 B2
(45) Date of Patent: Jul. 29, 2025

(54) AIR MATTRESS AND PRODUCTION METHOD OF AIR MATTRESS

(71) Applicant: Foshan Tiansheng Leisure Sports Goods Co., LTD, Foshan (CN)

(72) Inventors: Guoming Zhang, Foshan (CN); Guangyang Xie, Foshan (CN); Fuliang Wang, Foshan (CN); Jinjian Tan, Foshan (CN); Long Zhu, Foshan (CN)

(73) Assignee: FOSHAN TIANSHENG LEISURE SPORTS GOODS CO., LTD, Foshan (CN)

( * ) Notice: Subject to any disclaimer, the term of this patent is extended or adjusted under 35 U.S.C. 154(b) by 213 days.

(21) Appl. No.: 18/219,099

(22) Filed: Jul. 7, 2023

(65) Prior Publication Data

US 2024/0382012 A1    Nov. 21, 2024

(30) Foreign Application Priority Data

May 17, 2023    (CN) .......................... 202321205376.7

(51) Int. Cl.
| | |
|---|---|
| *A47C 27/08* | (2006.01) |
| *A47C 27/18* | (2006.01) |
| *B29D 22/02* | (2006.01) |
| *B29K 27/06* | (2006.01) |

(52) U.S. Cl.
CPC .......... *A47C 27/081* (2013.01); *A47C 27/087* (2013.01); *A47C 27/18* (2013.01); *B29D 22/02* (2013.01); *A47C 27/08* (2013.01); *B29K 2027/06* (2013.01)

(58) Field of Classification Search
CPC ..... A47C 27/081; A47C 27/087; A47C 27/08; A47C 27/18; B29D 22/02; B29D 22/00; B29K 2027/06
USPC .................. 5/709, 706, 711, 712, 654, 655.3
See application file for complete search history.

(56) References Cited

U.S. PATENT DOCUMENTS

| | | | | |
|---|---|---|---|---|
| 3,251,075 | A * | 5/1966 | Saltness et al. ..... | A47G 9/1027 383/3 |
| 7,337,485 | B2 * | 3/2008 | Metzger ............... | A47C 27/087 5/711 |
| 7,694,372 | B1 * | 4/2010 | Boyd ................... | A47C 27/081 5/711 |
| 10,687,633 | B2 * | 6/2020 | Liu ...................... | A47C 27/087 |

(Continued)

FOREIGN PATENT DOCUMENTS

| | | | | |
|---|---|---|---|---|
| AU | 2023285997 B1 * | 4/2025 | .......... | A47C 27/081 |
| CN | 111000399 A | 4/2020 | | |

(Continued)

*Primary Examiner* — Robert G Santos
(74) *Attorney, Agent, or Firm* — Bayramoglu Law Offices LLC (57) ABSTRACT

An air mattress and a production method of an air mattress are provided. The air mattress includes a first sheet and a second sheet, where the first sheet includes a first surface sheet; a periphery of the first surface sheet is provided with multiple first side sheets; the multiple first side sheets are integrally formed with the first surface sheet; adjacent side edges of each two adjacent first side sheets are connected, such that the multiple first side sheets are sequentially connected to form a first enclosing sheet; and the second sheet is connected to an end of the first enclosing sheet away from the first surface sheet.

13 Claims, 6 Drawing Sheets

(56) References Cited

U.S. PATENT DOCUMENTS

| | | | | |
|---|---|---|---|---|
| 11,419,431 B2* | 8/2022 | Li | .......................... | A47C 27/10 |
| 11,564,505 B2* | 1/2023 | Liu | ........................ | A47C 27/16 |
| 11,583,099 B2* | 2/2023 | Li | .......................... | A47C 27/10 |
| 11,937,703 B2* | 3/2024 | Shi | ....................... | A47C 27/082 |
| 11,969,098 B1* | 4/2024 | Shi | ....................... | A47C 27/087 |
| 12,102,235 B1* | 10/2024 | Luo | ...................... | A47C 27/087 |
| 12,256,844 B2* | 3/2025 | Shi | ....................... | A47C 27/081 |
| 2006/0265810 A1* | 11/2006 | Wu | ....................... | A47C 27/081 |
| | | | | 5/712 |
| 2007/0044243 A1* | 3/2007 | Metzger | ............... | A47C 27/087 |
| | | | | 5/710 |
| 2017/0196368 A1* | 7/2017 | Liu | ........................ | A47C 27/16 |
| 2020/0315366 A1* | 10/2020 | Liu | ........................ | A47C 27/16 |
| 2021/0127849 A1* | 5/2021 | Li | .......................... | A47C 27/10 |
| 2021/0196053 A1* | 7/2021 | Li | .......................... | A47C 27/10 |
| 2022/0202198 A1* | 6/2022 | Li | ........................ | A47C 27/087 |
| 2023/0098052 A1* | 3/2023 | Shi | ....................... | A47C 27/082 |
| | | | | 5/706 |
| 2023/0122867 A1* | 4/2023 | Liu | ...................... | A47C 27/081 |
| | | | | 5/709 |
| 2024/0016303 A1* | 1/2024 | Shi | ....................... | A47C 27/082 |
| 2024/0382012 A1* | 11/2024 | Zhang | .................... | A47C 27/18 |
| 2025/0049226 A1* | 2/2025 | Shi | ....................... | A47C 27/082 |
| 2025/0107636 A1* | 4/2025 | Zhang | .................... | A47C 27/087 |
| 2025/0120517 A1* | 4/2025 | Zeng | .................... | A47C 27/002 |

FOREIGN PATENT DOCUMENTS

| | | | | |
|---|---|---|---|---|
| EP | 4537710 A1 * | 4/2025 | ........... | A47C 27/002 |
| EP | 4548812 A1 * | 5/2025 | ........... | A47C 27/081 |

* cited by examiner

AIR MATTRESS AND PRODUCTION METHOD OF AIR MATTRESS

CROSS REFERENCE TO THE RELATED APPLICATIONS

This application is based upon and claims priority to Chinese Patent Application No. 202321205376.7, filed on May 17, 2023, the entire contents of which are incorporated herein by reference.

TECHNICAL FIELD

The present disclosure relates to the technical field of inflatable products, and in particular to an air mattress and a production method of an air mattress.

BACKGROUND

Air mattresses are popular because they are lightweight and easy to carry and store. Air mattresses can serve as guest beds. The outer body of the existing air mattress usually includes a top sheet, a bottom sheet, and an enclosing sheet located between the top sheet and the bottom sheet to connect edges of the top sheet and the bottom sheet. In the production of the outer body of an air mattress, the top sheet, the bottom sheet, and the enclosing sheet are first cut, and then their edges are connected. The production process requires many connection materials and long connection seams, resulting in low production efficiency and high labor costs. In addition, the edges of the connection seams between the top sheet and the enclosing sheet and between the bottom sheet and the enclosing sheet protrude outward to form two peripheral lips. The rough peripheral lips may result in making the user uncomfortable when his/her skin comes into contact with the peripheral lips.

SUMMARY

A major objective of the present disclosure is to propose an air mattress and a production method of an air mattress. The present disclosure aims to solve the technical problem that the air mattress in the prior art requires many connection materials and has low production efficiency.

To achieve the above objective, the present disclosure proposes an air mattress. The air mattress includes:
- a first sheet, including a first surface sheet, where a periphery of the first surface sheet is provided with multiple first side sheets; the multiple first side sheets are integrally formed with the first surface sheet; and adjacent side edges of each two adjacent first side sheets are connected, such that the multiple first side sheets are sequentially connected to form a first enclosing sheet; and
- a second sheet, connected to an end of the first enclosing sheet away from the first surface sheet, where the first sheet and the second sheet define an inflatable air chamber.

The first sheet includes the first surface sheet integrally formed with the multiple first side sheets. In the production of the air mattress, the multiple first side sheets are bent relative to the first surface sheet. The side edges of each two adjacent first side sheets are sequentially connected, such that the multiple first side sheets are connected to form the first enclosing sheet. The second sheet is connected to the end of the first enclosing sheet away from the first surface sheet to form an outer body of the air mattress. In the present disclosure, the first sheet and the second sheet are connected to form the outer body of the air mattress. The air mattress in the prior art involves three sheets, namely a top sheet, a bottom sheet, and an enclosing sheet. Compared to the prior art, the present disclosure reduces the connection materials, and shortens the connection seam, thereby improving production efficiency and reducing labor costs. In the present disclosure, there is only one peripheral lip formed between the first sheet and the second sheet, reducing the use of the peripheral lip, thereby reducing the contact between the user's skin and the peripheral lip during use is reduced and improving user comfort and experience.

Preferably, the connected side edges of each two adjacent first side sheets protrude from an inner surface of the first enclosing sheet in the air chamber.

Preferably, the second sheet includes a second surface sheet; and an edge of the second surface sheet is connected to the end of the first enclosing sheet away from the first surface sheet.

Preferably, the second sheet includes a second surface sheet; a periphery of the second surface sheet is provided with multiple second side sheets; the multiple second side sheets are integrally formed with the second surface sheet; adjacent side edges of each two adjacent second side sheets are connected, such that the multiple second side sheets are sequentially connected to form a second enclosing sheet; and an end of the second enclosing sheet away from the second surface sheet is connected to the end of the first enclosing sheet away from the first surface sheet.

Preferably, the air mattress further includes intermediate tensioning sheets located in the air chamber; the intermediate tensioning sheets are arranged between the first surface sheet and the second surface sheet; the intermediate tensioning sheets each include one end connected to the first surface sheet and the other end connected to the second surface sheet; and the intermediate tensioning sheets are configured to limit outward expansion of the first surface sheet and the second surface sheet during inflation of the air mattress.

Preferably, the air mattress further includes a first diagonal tensioning sheet and a second diagonal tensioning sheet arranged in the air chamber; the first diagonal tensioning sheet includes one end connected to the first surface sheet and the other end connected to the first enclosing sheet; the second diagonal tensioning sheet includes one end connected to the second surface sheet and the other end connected to the first enclosing sheet; and the first diagonal tensioning sheet and the second diagonal tensioning sheet are configured to limit outward expansion of the first enclosing sheet during inflation of the air mattress.

Preferably, the first diagonal tensioning sheet and the second diagonal tensioning sheet are arranged in a circular shape along the first enclosing sheet; the first diagonal tensioning sheet is provided with a first venthole; and the second diagonal tensioning sheet is provided with a second venthole.

Preferably, the first diagonal tensioning sheet and the first enclosing sheet are connected at a first connection seam; the second diagonal tensioning sheet and the first enclosing sheet are connected at a second connection seam; and a distance between the first connection seam and the first surface sheet is equal to a distance between the second connection seam and the second surface sheet.

Preferably, the first surface sheet is rectangular; there are four first side sheets respectively arranged at four sides of the first surface sheet; and the four first side sheets are all rectangular.

Preferably, an outer surface of at least one of the first sheet and the second sheet is provided with a flocking layer.

A production method of an air mattress includes the following steps:

S1: providing a first sheet and a second sheet, where the first sheet includes a first surface sheet located in a central part and multiple first side sheets located at a periphery of the first surface sheet;

S2: folding up the first side sheets, and connecting adjacent side edges of each two adjacent first side sheets to form a first enclosing sheet; and S3: connecting the second sheet to an end of the first enclosing sheet away from the first surface sheet.

Preferably, the production method further includes step S11 after step S1: providing intermediate tensioning sheets, and connecting the intermediate tensioning sheets between the first surface sheet of the first sheet and the second surface sheet of the second sheet.

Preferably, the production method further includes the following steps after step S2:

S21: providing a first diagonal tensioning sheet; and connecting one end of the first diagonal tensioning sheet to the first surface sheet and the other end of the first diagonal tensioning sheet to the first enclosing sheet; and S22: providing a second diagonal tensioning sheet; and connecting one end of the second diagonal tensioning sheet to the first enclosing sheet and the other end of the second diagonal tensioning sheet to the second surface sheet.

The production method reduces the connection materials and shortens the connection seams, thereby improving production efficiency and reducing labor costs.

BRIEF DESCRIPTION OF THE DRAWINGS

To describe the technical solutions in the embodiments of the present application or in the prior art more clearly, the following briefly describes the drawings required for describing the embodiments or the prior art. Apparently, the drawings in the following description show some embodiments of the present application, and those skilled in the art may still derive other drawings from these drawings without creative efforts.

Reference Numerals: 1. first sheet; 11. first surface sheet; 12. first side sheet; 121. sixth weld seam; 13. first enclosing sheet; 14. gap; 15. first weld seam; 2. second sheet; 21. second surface sheet; 22. second side sheet; 23. second enclosing sheet; 24. peripheral lip; 3. air chamber; 4. intermediate tensioning sheet; 5. first diagonal tensioning sheet; 51. second weld seam; 52. third weld seam; 53. first connection seam; 54. first venthole; 6. second diagonal tensioning sheet; 62. fifth weld seam; 63. second connection seam; and 64. second venthole.

The implementation of the objective, functional characteristics and advantages of the present disclosure will be further described below with reference to the embodiments and the drawings.

DETAILED DESCRIPTION OF THE EMBODIMENTS

The following clearly and completely describes the technical solutions in the embodiments of the present application with reference to the drawings in the embodiments of the present application. Apparently, the described embodiments are merely a part rather than all of the embodiments of the present application. All other embodiments obtained by those skilled in the art based on the embodiments of the present disclosure without creative efforts should fall within the protection scope of the present disclosure.

It should be noted that all the directional indications such as upper, lower, left, right, front, and rear in the embodiments of the present disclosure are merely used to explain relative position relationships or motion situations of the components in a specific gesture. If the specific gesture changes, the directional indication changes accordingly.

Moreover, the terms such as "first" and "second" described in the embodiments of the present disclosure used herein are only for the purpose of description and are not intended to indicate or imply relative importance, or implicitly indicate the number of the indicated technical features. Therefore, a feature limited by "first" or "second" may explicitly or implicitly include at least one such feature. Further, the technical solutions of the embodiments may be combined with each other on the basis that the combination is feasible for those skilled in the art. In case a combination of the technical solutions is contradictory or infeasible, such a combination is deemed inexistent and not falling within the protection scope of the present disclosure.

As shown in FIGS. 1 to 7, an air mattress includes first sheet 1 and second sheet 2.

Figure 5:
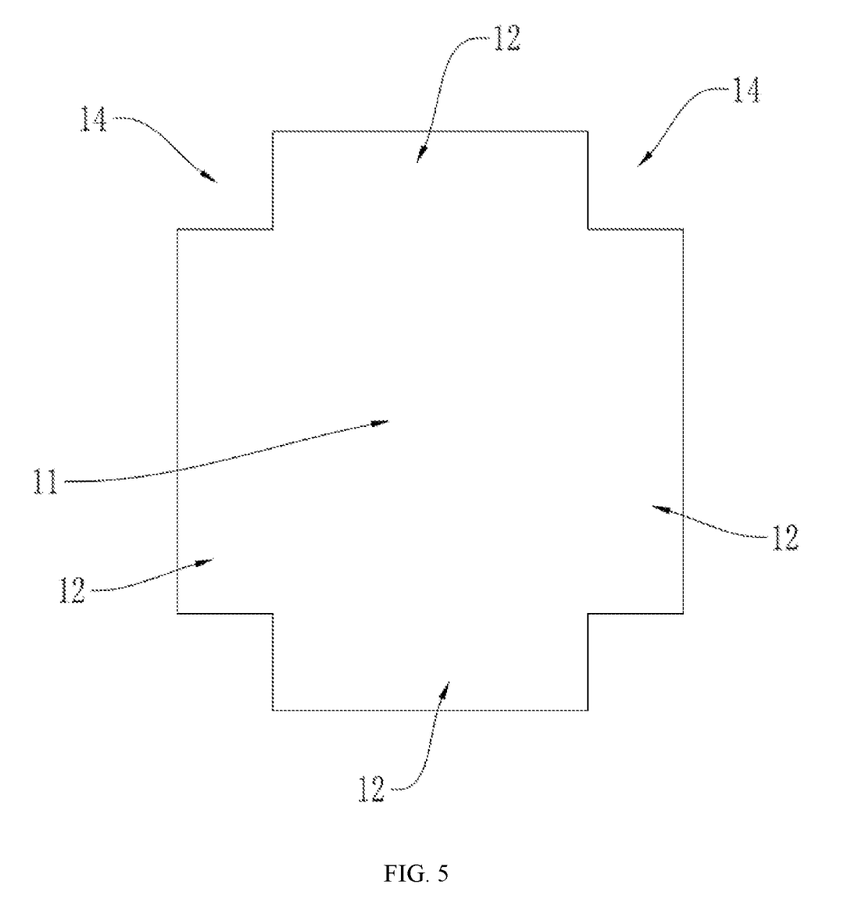
FIG. 5 is a structural diagram of a first sheet according to Embodiment 1 of the present disclosure.

The first sheet 1 includes first surface sheet 11. A periphery of the first surface sheet 11 is provided with multiple first side sheets 12. The multiple first side sheets 12 are integrally formed with the first surface sheet 11. Adjacent side edges of each two adjacent first side sheets 12 are connected, such that the multiple first side sheets 12 are sequentially connected to form first enclosing sheet 13. When the first sheet 1 is produced, the central first surface sheet 11 and the multiple peripheral first side sheets 12 are cut in one sheet. FIG. 5 is a schematic diagram of the first sheet 1 in an unfolded state. Gap 14 is formed between each two adjacent first side sheets 12. Due to the gap 14, when the first side sheets 12 are folded, the adjacent edges of each two first side sheets 12 are abutted against each other at the gap 14.

The second sheet 2 is connected to an end of the first enclosing sheet 13 away from the first surface sheet 11. The first sheet 1 and the second sheet 2 define inflatable air chamber 3. The first sheet 1 or the second sheet 2 is provided with an inflation and deflation port.

The first sheet 1 includes the first surface sheet 11 integrally formed with the multiple first side sheets 12. In the production of the air mattress, the multiple first side sheets 12 are bent relative to the first surface sheet 11. The side edges of each two adjacent first side sheets 12 are sequentially connected, such that the multiple first side sheets 12 are connected to form the first enclosing sheet 13. The second sheet 2 is connected to an end of the first enclosing sheet 13 away from the first surface sheet 11 to form an outer body of the air mattress. The first sheet 1 and the second sheet 2 may be made of polyvinyl chloride (PVC), etc. The connection positions of the air mattress can be connected in a sealed manner through high-frequency welding, etc.

In the present disclosure, the first sheet 1 and the second sheet 2 are connected to form the outer body of the air mattress. The air mattress in the prior art involves three sheets, namely a top sheet, a bottom sheet, and an enclosing sheet. Compared to the prior art, the present disclosure reduces the connection materials. Moreover, the length of the edge connecting each two first side sheets 12 is shorter than the length of the peripheral connection edge, reducing the length of the connection seam, thereby improving production efficiency and reducing labor costs. Since there is only one peripheral lip 24 formed between the first sheet 1 and the second sheet 2, the number of the peripheral lips 24 is reduced, and the contact between the user's skin and the peripheral lip 24 during use is reduced, improving user's comfort and experience.

Embodiment 1

The second sheet 2 includes second surface sheet 21. An edge of the second surface sheet 21 is connected to the end of the first enclosing sheet 13 away from the first surface sheet 11. The second surface sheet 21 of the second sheet 2 is a single sheet. The first enclosing sheet 13 forms an overall side of the air mattress. An outer edge of the second surface sheet 21 is directly connected to the first enclosing sheet 13.

In some specific embodiments, each two adjacent first side sheets 12 are connected to form sixth weld seam 121. The connected side edges of each two adjacent first side sheets 12 protrude from an inner surface of the first enclosing sheet 13 in the air chamber 3. The connected side edges of each two adjacent first side sheets 12 are located at an inner side of the air mattress. Therefore, an outer side of the first enclosing sheet is smooth, improving the comfort of user contact. Furthermore, after the edges of each two adjacent first side sheets 12 are connected, corners of the edges close to the first surface sheet 11 may form sharp protrusions. In this case, the sharp protrusions can be flattened by hot pressing.

Figure 3:
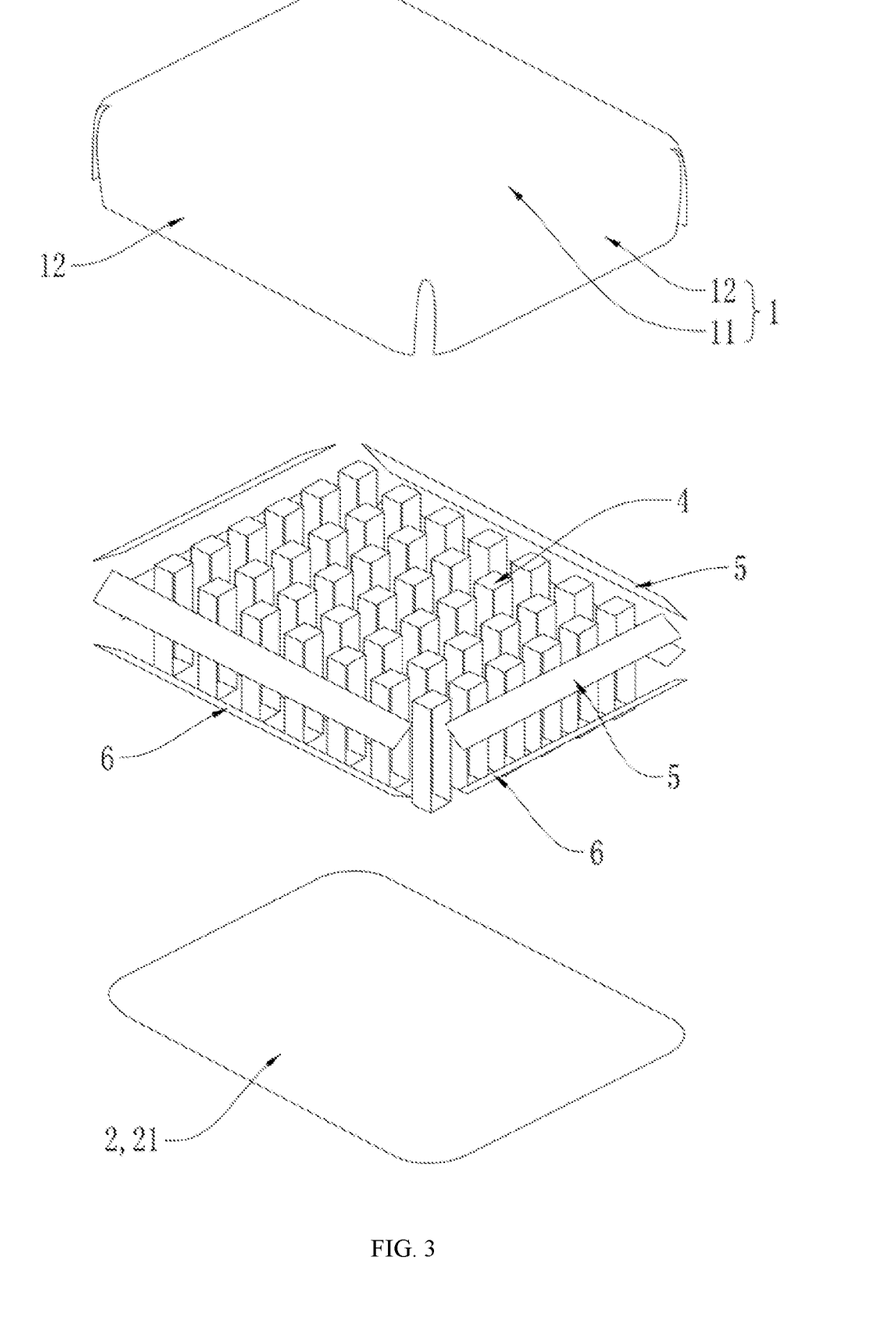
FIG. 3 is an exploded structural diagram of the air mattress according to Embodiment 1 of the present disclosure.

In some specific embodiments, referring to FIG. 3, the air mattress further includes intermediate tensioning sheets 4 located in the air chamber 3. The intermediate tensioning sheets 4 are arranged between the first surface sheet 11 and the second surface sheet 21. The intermediate tensioning sheets 4 each include one end connected to the first surface sheet 11 and the other end connected to the second surface sheet 21. The intermediate tensioning sheets 4 are configured to limit outward expansion of the first surface sheet 11 and the second surface sheet 21 during inflation of the air mattress. The two ends of each of the intermediate tensioning sheets 4 are respectively connected to the first surface sheet 11 and the second surface sheet 21. During inflation, the first surface sheet 11 and the second surface sheet 21 are first moved away from each other, and the intermediate tensioning sheets 4 are gradually straightened. When an inflation amount reaches a certain value or more, the intermediate tensioning sheets 4 are completely straightened, preventing a distance between the first surface sheet 11 and the second surface sheet 21 from further increasing, thus forming a shape of the air mattress. In some embodiments, referring to FIG. 3, the intermediate tensioning sheets 4 can be circular sheets, and the two ends of each of the circular sheets are connected to the first surface sheet 11 and the second surface sheet 21, respectively. The intermediate tensioning sheets 4 are connected to the first surface sheet 11 to form first weld seams 15. The multiple intermediate tensioning sheets 4 are uniformly distributed in an array in a central part of the air mattress. The intermediate tensioning sheets 4 can also be existing straight sheets, such as I-shaped or Y-shaped tensioning sheets that extend along a length or width of the air mattress. Two ends of each of the I-shaped or Y-shaped tensioning sheets are connected to the first surface sheet 11 and the second surface sheet 21, respectively. The multiple straight sheets are arranged in intervals.

Figure 1:
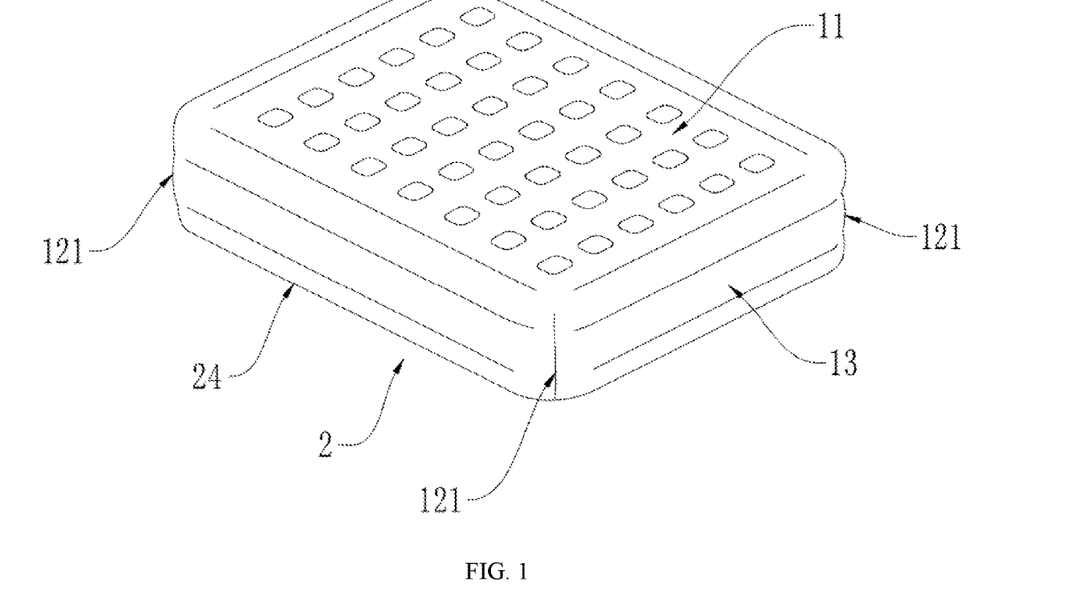
FIG. 1 is a structural diagram of an air mattress according to Embodiment 1 of the present disclosure.
Figure 2:
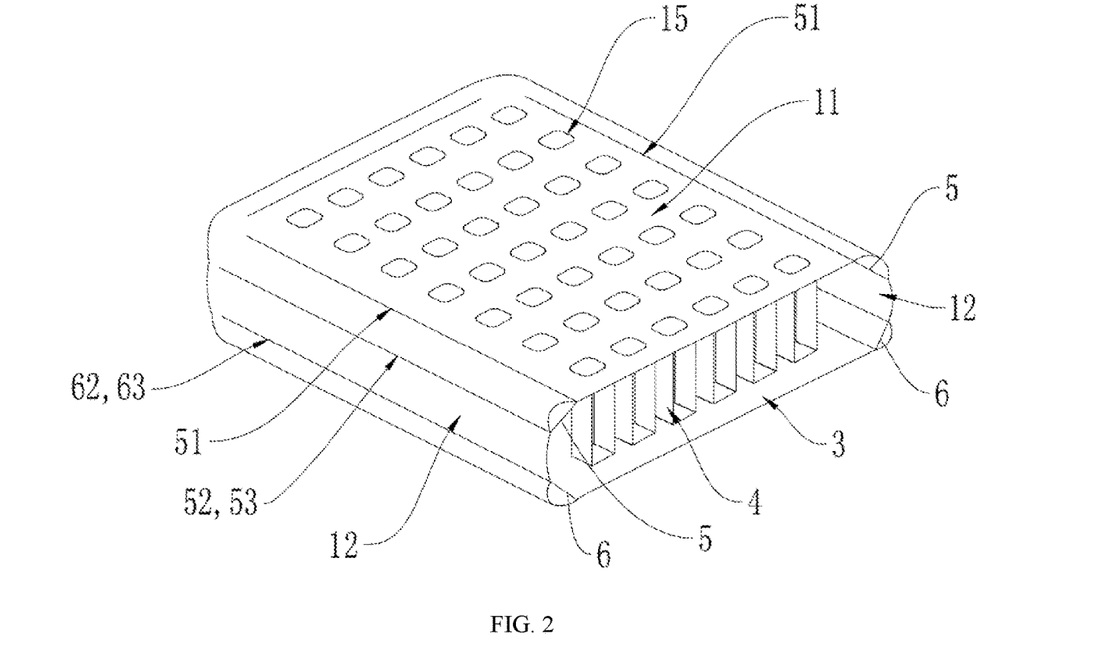
FIG. 2 is an internal structural diagram of the air mattress according to Embodiment 1 of the present disclosure.
Figure 4:
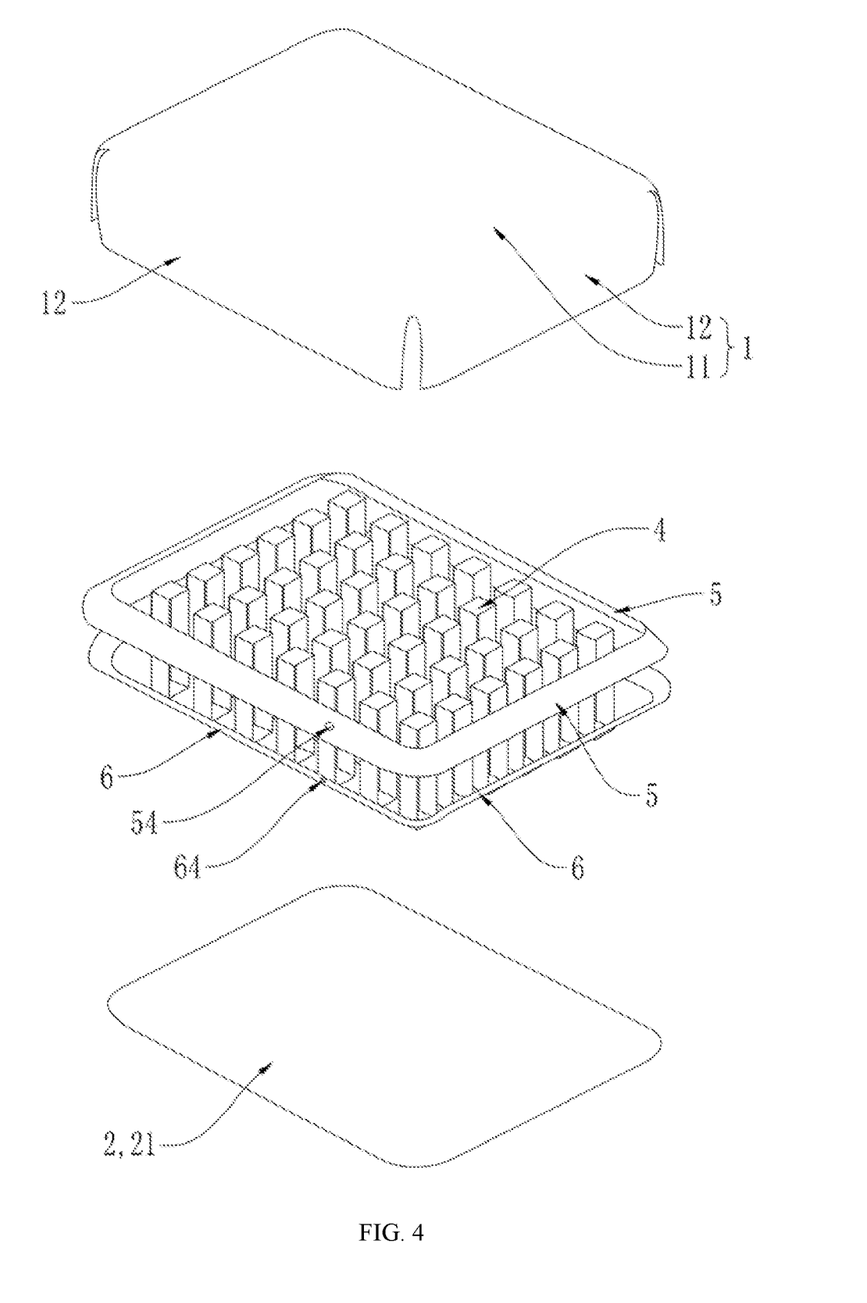
FIG. 4 is an exploded structural diagram of another air mattress according to Embodiment 1 of the present disclosure.

In some specific embodiments, referring to FIGS. 2 to 4, the air mattress further includes first diagonal tensioning sheet 5 and second diagonal tensioning sheet 6 arranged in the air chamber 3. The first diagonal tensioning sheet 5 includes one end connected to the first surface sheet 11 to form second weld seam 51 and the other end connected to the first enclosing sheet 13 to form third weld seam 52. The second diagonal tensioning sheet 6 includes one end connected to the second surface sheet 21 to form fourth weld seam and the other end connected to the first enclosing sheet 13 to form fifth weld seam 62. The first diagonal tensioning sheet 5 and the second diagonal tensioning sheet 6 are configured to limit outward expansion of the first enclosing sheet 13 during the inflation of the air mattress. During inflation, the first diagonal tensioning sheet 5 pulls the first surface sheet 11 and the first side sheets 12, while the second diagonal tensioning sheet 6 pulls the second surface sheet 21 and the first side sheets 12, so as to prevent excessive expansion of the first enclosing sheet 13. In this way, a three-layer appearance structure is formed on the first enclosing sheet 13.

Furthermore, the first diagonal tensioning sheet 5 and the second diagonal tensioning sheet 6 are arranged in a circular shape along the first enclosing sheet 13. The first diagonal tensioning sheet 5 is provided with first venthole 54, and the second diagonal tensioning sheet 6 is provided with second venthole 64. The first diagonal tensioning sheet 5 and the second diagonal tensioning sheet 6 are arranged in a circular shape along the first enclosing sheet 13. The first diagonal tensioning sheet 5 and the second diagonal tensioning sheet 6 in the circular shape cooperate to limit the outward expansion of the first enclosing sheet 13. The first venthole and the second venthole communicate the entire air chamber 3, allowing air to fill the air mattress during inflation. Specifically, referring to FIG. 4, the first diagonal tensioning sheet 5 can be a circular tensioning sheet, and the first venthole 54 can be provided at any position of the circular first diagonal tensioning sheet 5. Alternatively, referring to FIG. 3, multiple first diagonal tensioning sheets 5 can be arranged to form a circular structure. There is a gap between each two adjacent two first diagonal tensioning sheets 5 to form the first venthole. The structure of the second diagonal tensioning sheet 6 with the second venthole is similar to that of the first diagonal tensioning sheet 5. The first diagonal tensioning sheet 5 and the second diagonal tensioning sheet 6 can also be other existing diagonal tensioning sheets.

Furthermore, the first diagonal tensioning sheet 5 and the first enclosing sheet 13 are connected at first connection seam 53, and the second diagonal tensioning sheet 6 and the first enclosing sheet 13 are connected at second connection seam 63. A distance between the first connection seam 53 and the first surface sheet 11 is equal to a distance between the second connection seam 63 and the second surface sheet 21.

In some specific embodiments, the first surface sheet 11 and the second surface sheet 21 are rectangular. There are four first side sheets 12. The four first side sheets 12 are respectively arranged at four sides of the first surface sheet 11. The four first side sheets 12 are all rectangular to form a roughly rectangular-solid air mattress. In some embodiments, the first surface sheet 11 and the second surface sheet 21 may be triangles or hexagons, etc.

In some specific embodiments, an outer surface of at least one of the first sheet 1 and the second sheet 2 is provided with a flocking layer. The flocking layer has a soft surface, making contact between the user's skin and the flocking layer comfortable to meet more usage needs. In other embodiments, the first sheet 1 and the second sheet 2 may be provided with fabric layer or rubber layer according to actual needs.

Embodiment 2

Figure 6:
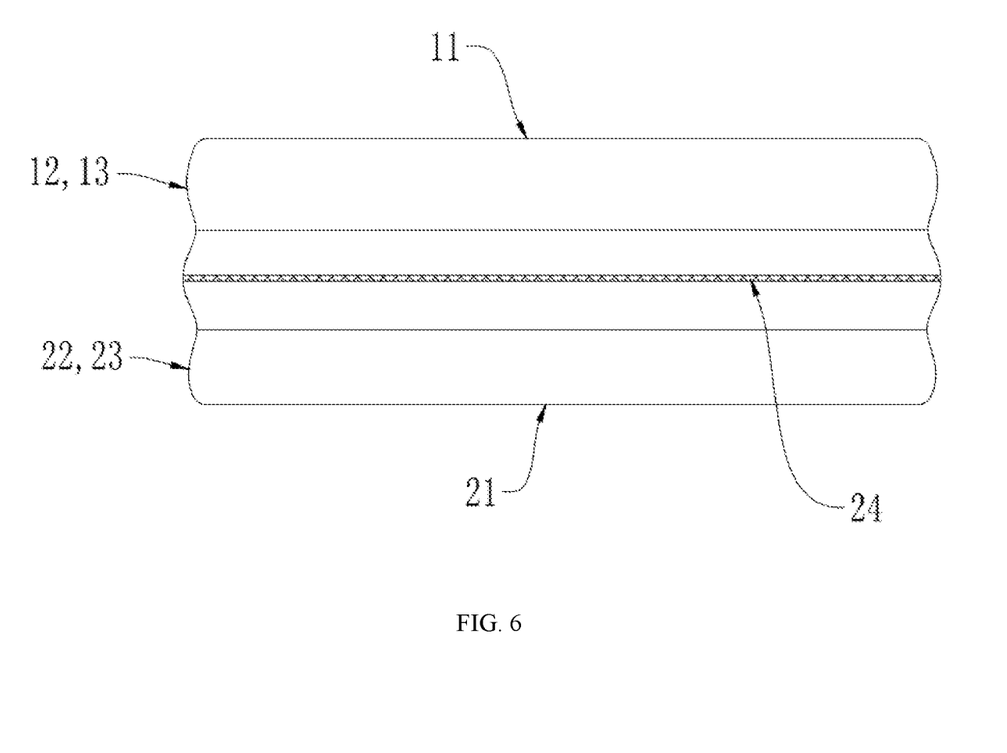
FIG. 6 is a side-view structural diagram of an air mattress according to Embodiment 2 of the present disclosure.
Figure 7:
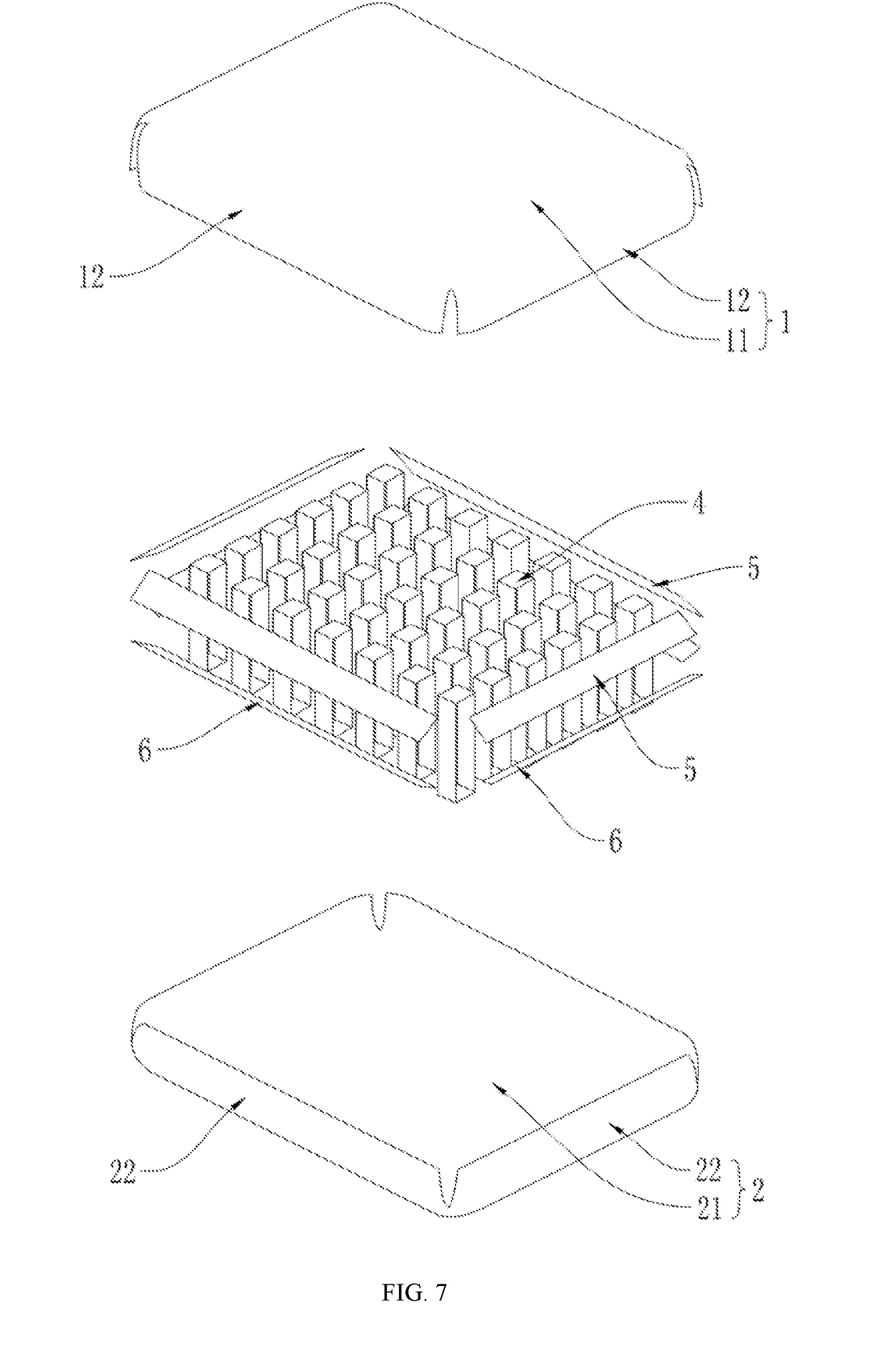
FIG. 7 is an exploded structural diagram of the air mattress according to Embodiment 2 of the present disclosure.

Referring to FIGS. 6 and 7, Embodiment 2 provides an air mattress. The air mattress of this embodiment is basically the same as that of Embodiment 1, except for the following differences. In this embodiment, the second sheet 2 includes second surface sheet 21. Multiple second side sheets 22 are arranged at a periphery of the second surface sheet 21. The multiple second side sheets 22 are integrally formed with the second surface sheet 21. Adjacent side edges of each two adjacent second side sheets 22 are connected, such that the multiple second side sheets 22 are sequentially connected to form second enclosing sheet 23. An end of the second enclosing sheet 23 away from the second surface sheet 21 is connected to the end of the first enclosing sheet 13 away from the first surface sheet 11. The second sheet 2 includes the second surface sheet 21 integrally formed with the multiple second side sheets 22. The multiple second side sheets 22 are connected to form the second enclosing sheet 23. The second enclosing sheet 23 and the first enclosing sheet 13 are connected to form an enclosing side of the air mattress. The peripheral lip 24 is located in a central part of the enclosing side of the air mattress. The second diagonal tensioning sheet 6 is connected to the second surface sheet 21 and the second enclosing sheet 23.

The first diagonal tensioning sheet 5 includes one end connected to the first surface sheet 11 and the other end connected to the first enclosing sheet 13. The second diagonal tensioning sheet 6 includes one end connected to the second surface sheet 21 and the other end connected to the second enclosing sheet 23.

It should be noted that a connection point of the side edges of each two adjacent first side sheets 12 and a connection point of the side edges of each two adjacent second side sheets 22 may be provided with a reinforcement sheet that covers at least the connection point to reduce a risk of air leakage.

A production method of an air mattress includes the following steps.
 S1. First sheet 1 and second sheet 2 are provided. The first sheet 1 includes first surface sheet 11 located in a central part and multiple first side sheets 12 located at a periphery of the first surface sheet 11.
 S2. The first side sheets 12 are folded up, and adjacent side edges of each two adjacent first side sheets 12 are connected to form first enclosing sheet 13.
 S3. The second sheet 2 is connected to the first enclosing sheet 13.

In some embodiments, the production method further includes Step S11 after Step S1: intermediate tensioning sheets 4 are provided, and the intermediate tensioning sheets 4 are connected between the first surface sheet 11 of the first sheet 1 and the second surface sheet 21 of the second sheet 2.

Furthermore, the production method further includes the following steps after Step S2.
 S21. First diagonal tensioning sheet 5 is provided. The first diagonal tensioning sheet 5 includes one end connected to the first surface sheet 11 and the other end connected to the first enclosing sheet 13.
 S22. Second diagonal tensioning sheet 6 is provided. The second diagonal tensioning sheet 6 includes one end connected to the first enclosing sheet 13 and the other end connected to the second surface sheet 21.

The production method can reduce the connection materials, and reduce the length of the connection seams, thereby improving production efficiency and reducing labor costs.

The foregoing are merely preferred embodiments of the present disclosure, and the scope of the present disclosure is not limited thereto. Any equivalent structure change made using the content of the specification of the present disclosure and the drawings under the inventive concept of the present disclosure, or direct/indirect application thereof in other related technical fields, shall fall within the protection scope of the present disclosure.

What is claimed is:

1. An air mattress, comprising:
    a first sheet, comprising a first surface sheet, wherein a periphery of the first surface sheet is provided with a plurality of first side sheets; the plurality of first side sheets are integrally formed as extensions of the first surface sheet; and adjacent side edges of each two adjacent first side sheets are connected, wherein the plurality of first side sheets are sequentially connected to form a first enclosing sheet;
    a second sheet, connected to an end of the first enclosing sheet away from the first surface sheet, wherein the first sheet and the second sheet define an inflatable air chamber; and
    a first diagonal tensioning sheet and a second diagonal tensioning sheet arranged in the air chamber, wherein the first diagonal tensioning sheet comprises a first end directly connected to the first surface sheet and a second end directly connected to the first enclosing sheet,
    wherein the second diagonal tensioning sheet comprises a first end directly connected to the second sheet and a second end directly connected to the first enclosing sheet, and
    wherein the first diagonal tensioning sheet and the second diagonal tensioning sheet are configured to limit outward expansion of the first enclosing sheet during inflation of the air mattress.

2. The air mattress according to claim 1, wherein the connected side edges of each two adjacent first side sheets protrude from an inner surface of the first enclosing sheet in the air chamber.

3. The air mattress according to claim 1, wherein the second sheet comprises a second surface sheet, wherein the first end of the second diagonal tensioning sheet is directly connected to the second surface sheet; and an edge of the second surface sheet is connected to the end of the first enclosing sheet away from the first surface sheet.

4. The air mattress according to claim 3, further comprising intermediate tensioning sheets located in the air chamber, wherein the intermediate tensioning sheets are arranged between the first surface sheet and the second surface sheet;

the intermediate tensioning sheets each comprise a first end connected to the first surface sheet and a second end connected to the second surface sheet; and the intermediate tensioning sheets are configured to limit outward expansion of the first surface sheet and the second surface sheet during inflation of the air mattress.

5. The air mattress according to claim 3, wherein the first diagonal tensioning sheet and the second diagonal tensioning sheet are arranged in a circular shape along the first enclosing sheet; the first diagonal tensioning sheet is provided with a first venthole; and the second diagonal tensioning sheet is provided with a second venthole.

6. The air mattress according to claim 3, wherein the first diagonal tensioning sheet and the first enclosing sheet are connected at a first connection seam; the second diagonal tensioning sheet and the first enclosing sheet are connected at a second connection seam; and a distance between the first connection seam and the first surface sheet is equal to a distance between the second connection seam and the second surface sheet.

7. The air mattress according to claim 1, wherein the second sheet comprises a second surface sheet; a periphery of the second surface sheet is provided with a plurality of second side sheets; the plurality of second side sheets are integrally formed with the second surface sheet; adjacent side edges of each two adjacent second side sheets are connected, wherein the plurality of second side sheets are sequentially connected to form a second enclosing sheet; and an end of the second enclosing sheet away from the second surface sheet is connected to the end of the first enclosing sheet away from the first surface sheet.

8. The air mattress according to claim 7, further comprising intermediate tensioning sheets located in the air chamber, wherein the intermediate tensioning sheets are arranged between the first surface sheet and the second surface sheet;

the intermediate tensioning sheets each comprise a first end connected to the first surface sheet and a second end connected to the second surface sheet; and the intermediate tensioning sheets are configured to limit outward expansion of the first surface sheet and the second surface sheet during inflation of the air mattress.

9. The air mattress according to claim 1, wherein the first surface sheet is rectangular; there are four first side sheets respectively arranged at four sides of the first surface sheet; and the four first side sheets are all rectangular.

10. The air mattress according to claim 1, wherein an outer surface of at least one of the first sheet and the second sheet is provided with a flocking layer.

11. A production method of an air mattress, comprising the following steps:

S1: providing a first sheet and a second sheet, wherein the first sheet comprises a first surface sheet located in a central part and a plurality of first side sheets located at a periphery of the first surface sheet, wherein the second sheet comprises a second surface sheet;

S2: folding up the plurality of first side sheets, and connecting adjacent side edges of each two adjacent first side sheets to form a first enclosing sheet;

S1: providing a first diagonal tensioning sheet, connecting a first end of the first diagonal tensioning sheet directly to the first surface sheet and connecting a second end of the first diagonal tensioning sheet directly to the first enclosing sheet;

S22: providing a second diagonal tensioning sheet, connecting a first end of the second diagonal tensioning sheet directly to the first enclosing sheet and connecting a second end of the second diagonal tensioning sheet directly to the second surface sheet; and S3: connecting the second sheet to an end of the first enclosing sheet away from the first surface sheet.

12. The production method according to claim 11, further comprising step S11 after step S1: providing intermediate tensioning sheets, and connecting the intermediate tensioning sheets between the first surface sheet of the first sheet and the second surface sheet of the second sheet.

13. The production method according to claim 11, wherein an edge of the second surface sheet is connected to the end of the first enclosing sheet away from the first surface sheet.

\* \* \* \* \*